United States Patent [19]

Landgraf

[11] Patent Number: 4,545,187
[45] Date of Patent: Oct. 8, 1985

[54] APPARATUS FOR HARVESTING FRUIT OR NUTS

[76] Inventor: Scott Landgraf, Rte. 1, Box 148, Madill, Okla. 73446

[21] Appl. No.: 600,427

[22] Filed: Apr. 16, 1984

[51] Int. Cl.⁴ .................... A01D 46/24; A01D 46/22
[52] U.S. Cl. .................................. 56/329; 56/328 TS
[58] Field of Search ........................... 56/328 TS, 329

[56] References Cited

U.S. PATENT DOCUMENTS

| | | | |
|---|---|---|---|
| 3,541,773 | 11/1970 | Cate | 56/329 |
| 3,596,455 | 8/1971 | Adrian | 56/329 |
| 3,683,617 | 8/1972 | Vallicella | 56/329 |
| 3,775,954 | 12/1973 | Van Schoyck | 56/329 |
| 3,964,244 | 6/1976 | Vallicella | 56/329 |
| 4,269,021 | 5/1981 | Friday | 56/329 |
| 4,279,118 | 2/1981 | Col et al. | 56/329 |
| 4,414,795 | 11/1983 | Johnstone et al. | 56/329 |

FOREIGN PATENT DOCUMENTS

| | | | |
|---|---|---|---|
| 436826 | 11/1967 | Sweden | 56/329 |
| 210544 | 11/1968 | U.S.S.R. | 56/329 |

Primary Examiner—Paul J. Hirsch
Attorney, Agent, or Firm—Kanz, Scherback & Timmons

[57] ABSTRACT

Apparatus for harvesting fruit or nuts which may be used with a conventional farm tractor or a self-propelled shaker unit and includes a forward frame member from which a first and second conveyor are independently attached in a parallel relationship. A cross member is attached between the rear portions of the first and second conveyors and includes a location for attaching the cross member to the drawbar of the tractor. The forward frame member attaches to the front of the tractor similar to a front-end loader. A frame is positioned between the first and second conveyors and supports a resilient top sheet which extends outwardly past the first and second conveyors. A first support device is attached to the rear portion of the first conveyor and includes an offset axle and wheel. A second support device is attached to the rear portion of the second conveyor and includes an offset axle and wheel. A third and fourth conveyor receive the fruit or nuts output from the first and second conveyors and deposit the fruit or nuts into a container which is removable supported by the forward frame member. Blowers are incorporated into the third and fourth conveyors to remove debris from the fruit or nuts prior to the deposit of the fruit or nuts into the container. First and second resilient sheets extend outwardly from the first and second conveyors and the outer edges are supported by rods which are pivotally mounted to the first and second conveyors. Drive devices are connected to the rearmost rods to pivot the rods and open and close the first and second sheets around the fruit or nut trees.

20 Claims, 3 Drawing Figures

APPARATUS FOR HARVESTING FRUIT OR NUTS

BACKGROUND OF THE INVENTION

1. Field of the Invention

The present invention relates in general to apparatus for harvesting fruit, nuts, or the like, and more particularly, to apparatus which may be used with a conventional farm tractor or a self-propelled shaker to provide a highly portable apparatus for movement from tree to tree for catching the fruit or nuts as they fall from a shaken tree and delivering the fruit or nuts to a suitable container.

2. Description of the Prior Art

The prior art fruit and nut harvesters are dedicated type machines which as a unit combine a power-driven vehicle, a shaker unit and a unit to catch and hold the fruit or nuts received from a tree. For example, U.S. Pat. No. 3,596,455 discloses a dedicated unit comprising a power unit, a shaker unit mounted to said power unit, a sheet placed in the general area of the fruit tree, conveyor means to transport the fallen fruit to a collection bin after receipt of same from the sheet. Also disclosed are a plurality of longitudinal members stacked in staggered relationship on the conveyor means to guide the fruit into the conveyor means after receiving the fruit directly from the tree or from the sheet.

U.S. Pat. No. 3,505,801 discloses an elongated inclined boom including a conveyor adapted to be carried by a tractor unit at its upper end with the other end reaching to the tree, a vibrator tree shaker mounted on the boom and a folding fruit catching canopy is also mounted on the boom.

U.S. Pat. No. 3,407,582 discloses a retractable, inverted umbrella-like drape to catch the falling fruit, a resilient gasket which is pivotable to a surrounding position with respect to the trunk of the tree, a tree shaking device, a conveyor mechanism which carries the fallen fruit to a storage box and a dedicated vehicle to which the previous elements are operatively mounted.

U.S. Pat. No. 3,474,609 discloses a self-propelled steerable vehicle having a long frame with a central open slot for receipt of the trunk of the tree as the vehicle is moved forwardly with respect to the tree, two separate tree shakers, two rectangular-shaped canvas catchers to receive fallen fruit, multiple foam-rubber louvers positioned between the edges of the catchers and a conveyor device which transports the fallen fruit to a storage bin.

The present invention as claimed is intended to provide a solution to various prior art deficiencies which include a high cost, dedicated power unit which cannot be easily or readily used for other functions. Many prior art devices also damage and/or bruise the fruit when the fruit falls onto various parts of the harvester. Also, many of the prior art devices are very complicated and complex with a great many elements and parts which results in low reliability and a high cost of maintenance. Many prior art devices are not easily and readily transportable from tree-to-tree. In addition, many prior art devices are limited in the diameter of the catching device which they can support.

SUMMARY OF THE INVENTION

The present invention provides apparatus for harvesting fruit or nuts directly from the trees upon which they are grown without damage to the fruit or nuts during the harvesting thereof. The apparatus for harvesting the fruit or nuts comprises a forward frame portion which is attached to the front portion of a conventional farm tractor or a self-propelled shaker in a manner similar to that for attaching a front end loader to a farm tractor. The front portion of an elongated first conveyor means is attached to a predetermined location on a first side of the forward frame portion while the front portion of an elongated second conveyor means is attached to a predetermined location on a second side of the forward frame portion such that the two conveyor means are essentially parallel. Separate support means are attached to the rear portion of each conveyor means and includes a wheel and support therefor which allows rotational and pivotal movement of each wheel. A cross member attached between the rear portions of the first and second conveyors includes means for attaching said member to the drawbar of the conventional farm tractor or the rear frame of a self-propelled shaker. Third and fourth conveyor means are operatively positioned and supported to convey the output of the first and second conveyor means, respectively, to a receiving container for the fruit or nuts. Blower means are operatively positioned with respect to said third and fourth conveyor means to remove debris from the fruit and nuts prior to their discharge from the conveyors into the receiving container. A cover frame portion supports a resilient top sheet portion which covers the farm tractor and all conveyors such that the fruit and nuts which fall onto said top sheet portion are directed outboard of the conveyors where the fruit and nuts fall onto the first and second sheet portions. The inner edges of the first and second sheet portions are supported by the outer edges of the first and second conveyor means while the outer edges of the first and second sheet portions are supported by the outer ends of support rods which are pivotally mounted at predetermined positions along the outer edges of first and second conveyor means. Drive means are operatively connected to the two end support rods to allow first and second sheet portions to assume an open and closed position with respect to the fruit or nut tree.

Among the advantages offered by the present invention is the capability to be supported by a conventional farm tractor or a self-propelled shaker and use the existing hydraulic system of the tractor or shaker to power the present invention. Means are provided to prevent the fruit or nuts from hitting any part of the invention, the farm tractor or the shaker which might damage the fruit or nuts. The present invention provides a unit which is less complicated and less expensive than the prior art units. The invention does not attach to the shaker unit. Blower means are incorporated to remove the debris from the fruit or nuts prior to their being collected in a central box which may be removed for unloading. The invention may be quickly and easily removed from the tractor or shaker which may then be used to perform other tasks. The invention provides the capability for allowing the support rods and catcher sheet portions to be easily and quickly changed to ones of a different size to provide a catching device of a different diameter size. The two main conveyors do not require a separate frame structure to provide support along their length. The configuration of the frame portion and the conveyors of the present invention provide sufficient strength to support a catching device of greater diameter than that of the prior art while still retaining desirable maneuverability of the invention.

Examples of the more important features and advantages of this invention have thus been summarized rather broadly in order that the detailed description thereof that follows may be better understood and in order that the contribution to the art may be better appreciated. There are, of course, additional features of the invention that will be described hereinafter and which will also form the subject of the claims appended thereto. Other features of the present invention will become apparent with reference to the following detailed description of a presently preferred embodiment thereof in connection with the accompanying drawing, wherein like reference numerals have been applied to like elements in which:

DESCRIPTION OF THE PREFERRED EMBODIMENT

Figure 1:
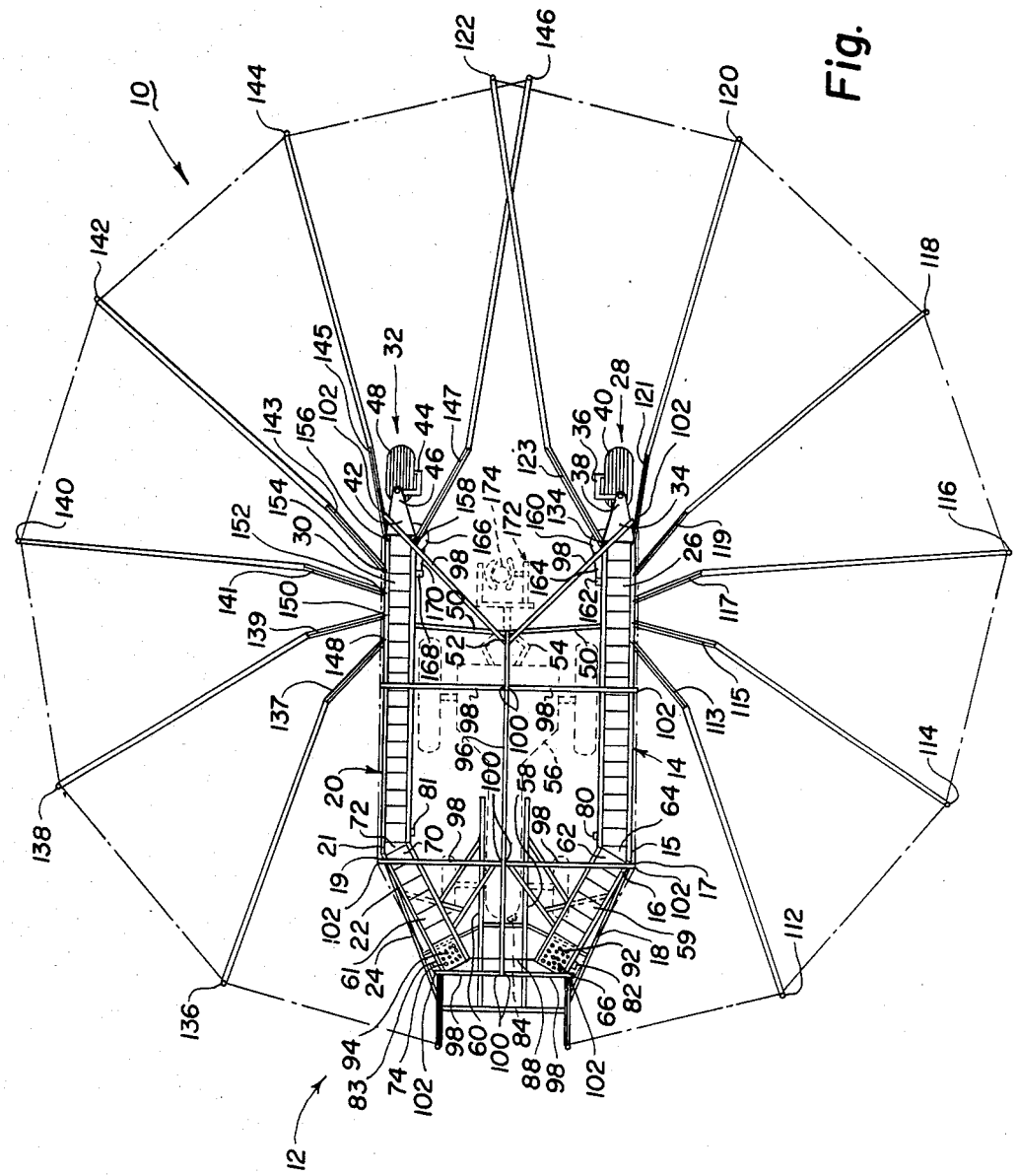
FIG. 1 is a simplified top plan view of fruit and nut harvesting apparatus incorporating the present invention but with the fruit and nut catching canopy and the container removed to improve clarity.
Figure 2:
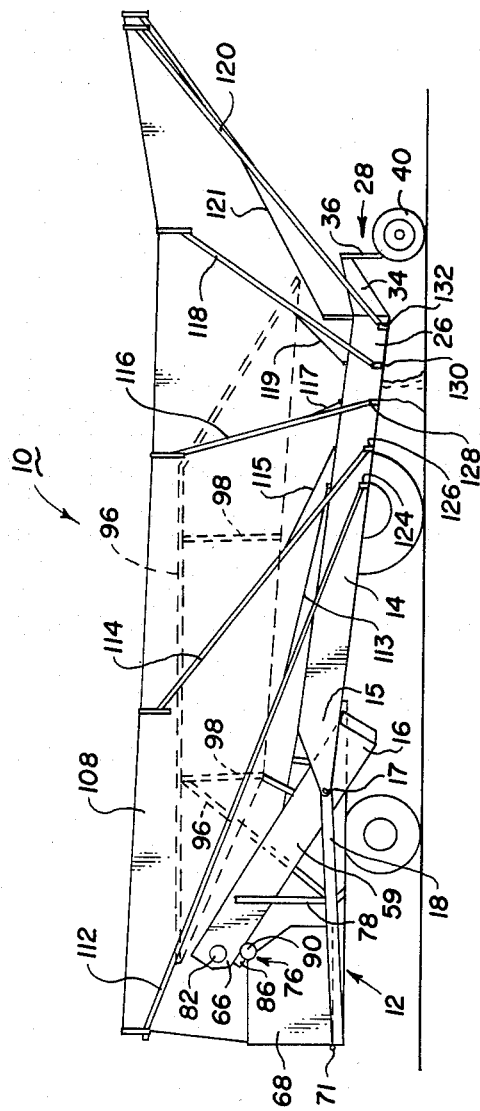
FIG. 2 is a simplified side elevational view of the fruit and nut harvesting apparatus according to the present invention.

Referring now to the drawing, and in particular, to FIGS. 1 and 2, fruit and nut harvesting apparatus according to the present invention, is generally referred to by reference numeral 10. The fruit and nut harvesting apparatus 10 comprises a forward frame portion 12, a first conveyor 14 whose front portion 15 is separately and operatively attached by conventional pivotal means 17 to the rear portion 16 of a first side 18 of forward frame portion 12 and a second conveyor 20 whose front portion 21 is separately and operatively attached by conventional pivotal means 19 to the rear portion 22 of a second side 24 of forward frame portion 12. Pivotal means 17 allows first conveyor 14 to pivot with respect to forward frame portion 12. Pivotal means 19 allows second conveyor 20 to pivot with respect to forward frame portion 12. The rear portion 26 of first conveyor 14 is supported a predetermined distance above the ground by support means 28 while the rear portion 30 of second conveyor 20 is supported essentially the same predetermined distance above the ground by support means 32. Front portions 15 and 21 are at least a foot higher than rear portions 26 and 30. In the preferred embodiment, support means 28 comprises support plate 34 which is operatively attached by conventional means to rear portion 26 and offset axle means 36 operatively attached between rear portion 38 of support plate 34 and wheel 40 to allow rotational and pivotal movement of wheel 40 with respect to first conveyor 14. In the preferred embodiment, support means 32 comprises support plate 42 which is operatively attached by conventional means to rear portion 30 and offset axle means 44 operatively attached between rear portion 46 of support plate 42 and wheel 48 to allow rotational and pivotal movement of wheel 48 with respect to second conveyor 20.

It will be appreciated that the present invention may be operatively connected to and operated by various power units such as a conventional farm tractor, a self-propelled shaker unit, etc. To keep repetition to a minimum, the present invention will be described below in connection with a farm tractor, without limiting the scope of the invention. It will be appreciated that the present invention could be described in connection with other power units and when various connections, functions, operations, etc. of the farm tractor are described, it will be appreciated that analogous connections, functions, operations etc. are implied for other power units.

A-frame 50 is operatively attached between rear portion 26 of first conveyor 14 and rear portion 30 of second conveyor 20 such that the center portion 52 of A-frame 50 is positioned to allow the fastening thereof to drawbar 54 of a conventional farm tractor 56 or to the rear frame of a self-propelled shaker. The front portion of forward frame portion 12 is attached to the front of the conventional farm tractor 56 at sections 58 and 60 in a conventional manner similar to that used to attach a front-end loader. It will be appreciated that the fruit and nut harvesting apparatus 10 is supported by a conventional farm tractor 56 by attachment to said farm tractor 56 at only three points or locations. The three points on the harvesting apparatus 10 being center portion 52 of A-frame 50, section 58 and section 60. The rear of the fruit and nut harvesting apparatus 10 is supported by support means 28 and 32 which extend between apparatus 10 and the ground. The major portion of the weight of the fruit and nut harvesting apparatus 10 is supported by support means 28 and 32 with minimal weight being carried by the conventional farm tractor 56. The first conveyor 14 and second conveyor 20 are essentially parallel and provide the dual function of conveying fruit and nuts to the third conveyor 59 and the fourth conveyor 61, respectively, and also providing the support function between the forward frame portion 12 and support means 28 and 32 without the need for a separate frame suspended therebetween.

Third conveyor 59 is supported by forward frame portion 12 such that the entrance portion 62 thereof is operatively supported under the exit portion 64 of first conveyor 14 to receive the fruit and nuts discharged by first conveyor 14. With reference to FIG. 2, the exit portion 66 of third conveyor 59 is operatively supported by upper frame portion 78 and is positioned to discharge the fruit and nuts received therein into container or box 68. In the preferred embodiment, third conveyor 59 is positioned at approximately forty-five degrees with respect to the horizontal.

Fourth conveyor 61 is supported by forward frame portion 12 such that the entrance portion 70 thereof is operatively supported under the exit portion 72 of second conveyor 20 to receive the fruit and nuts discharged by second conveyor 20. The exit portion 74 of fourth conveyor 61 is operatively supported by upper frame portion 78 and is positioned to discharge the fruit and nuts received therein into container or box 68. Upper frame portion 78 is operatively supported by forward frame portion 12. In the preferred embodiment, fourth conveyor 61 is positioned at approximately forty-five degrees with respect to the horizontal. In the preferred embodiment, container or box 68 may be lined with a resilient material such as canvas and is generally rectangular in shape. Container or box 68 is supported by forward frame portion 12 and is mounted for pivotal movement therefrom by pivotal means 71 (See FIG. 2). Container or box 68 may be pivoted counterclockwise (See FIG. 2) to unload the contents thereof. Hydraulic means in the form of a hydraulic cylinder may be used to assist in the pivoting of container or box 68. It will be appreciated that container or box 68 could be provided in the form of a canvas bag which is generally rectangular in shape and could be supported in a hanging relationship from extended portions of upper frame portion 78.

Conveyors 14, 20, 59 and 61 are powered by hydraulic motors. Hydraulic motor 80 is operatively connected to drive first conveyor 14 and is positioned at the front portion 15 of first conveyor 14. Hydraulic motor 81 is operatively connected to drive second conveyor 20 and is positioned at the front portion 21 of second conveyor 20. Hydraulic motor 82 is operatively connected to drive third conveyor 59 and is positioned at the exit portion 66 of third conveyor 59. Hydraulic motor 83 is operatively connected to drive fourth conveyor 61 and is positioned at the exit portion 74 of fourth conveyor 61. Hydraulic motors 80-83 as well as hydraulic motors 90 and hydraulic motors and drives 162 and 168 are all driven by the hydraulic pump 84 which is operatively positioned at the front of farm tractor 56. Hydraulic pump 84 is operatively connected to hydraulic motors 80-83 as well as to hydraulic motors 90 and hydraulic motors and drives 162 and 168 by conventional hydraulic lines supported by the fruit and nut harvesting apparatus 10. In some of the scaled down versions of the present invention, the power unit may not be equipped with a hydraulic pump of sufficient size and then an auxiliary hydraulic system would be required.

Blower means 76 is operatively positioned with respect to third conveyor 59 and fourth conveyor 61 to remove debris (leaves, twigs, etc.) from the conveyors prior to emptying the contents (fruit, nuts, debris, etc.) of the third and fourth conveyors 59 and 61 into the container or box 68. In the preferred embodiment, blower means 76 comprises two squirrel cage type blowers 86 sharing a common shaft 88 which is powered by a hydraulic motor 90. Hydraulic motor 90 being powered by the hydraulic system of the conventional farm tractor 56. A separate blower 86 is positioned in aperture 92 formed in the floor or bottom of third conveyor 59 in the exit portion 66 thereof. Another blower 86 is positioned in aperture 94 formed in the floor or bottom of fourth conveyor 61 in the exit portion 74 thereof. In operation, blowers 86 force air upwardly through apertures 92 and 94 to remove the debris being carried by third and fourth conveyors 59 and 61, respectively.

Figure 3:
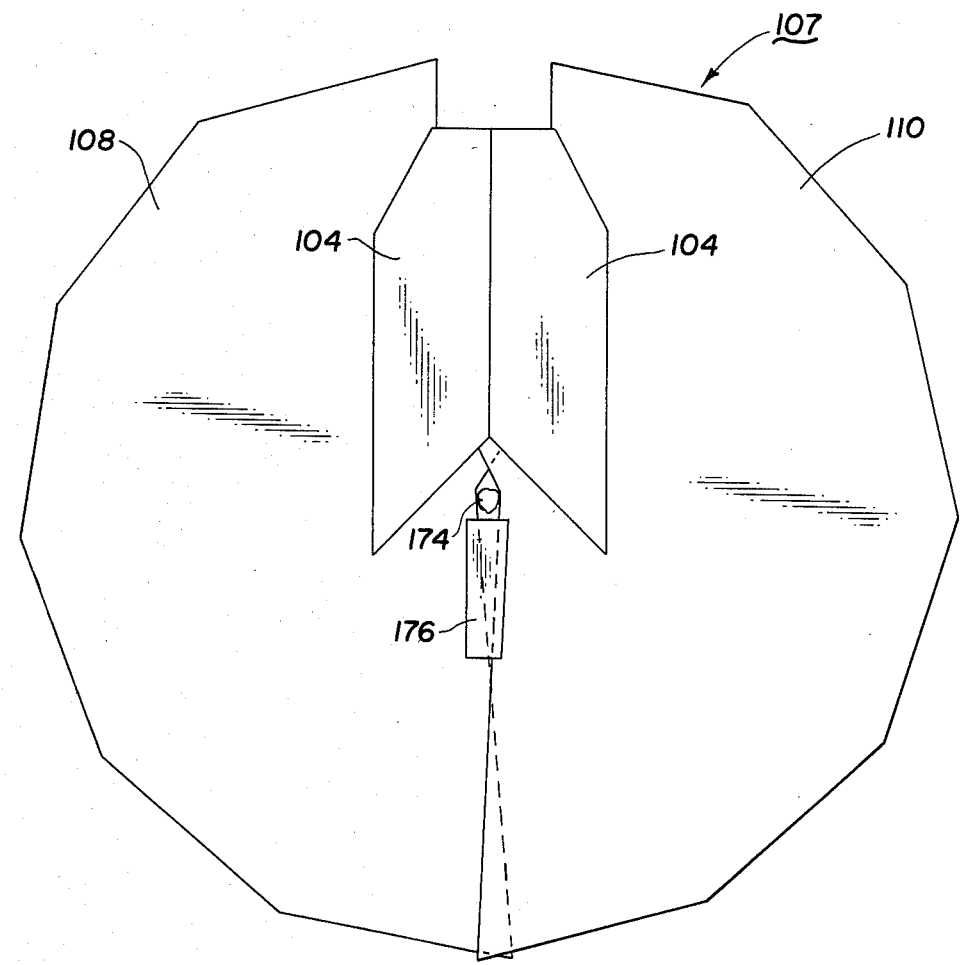
FIG. 3 is a simplified top plan view of fruit and nut harvesting apparatus according to the present invention with the fruit and nut catching canopy in place.

Cover frame portion 96 is supported by and attached to the forward frame portion 12. Support arms 98 are attached to cover frame portion 96 at a first end portion 100 with the second end portion 102 thereof being suspended in space above and beyond conveyors 14, 20, 59 and 61. With reference to FIG. 3, top sheet portion or catcher 104 is supported by cover frame portion 96 and support arms 98. Top sheet portion or catcher 104 is of such a size and shape as to provide continuous cover over the tractor 56 and conveyors 14, 20, 59 and 61. The fruit or nuts which are shaken from the tree fall onto the surface of top sheet portion or catcher 104 and then roll down to an outer edge of top sheet portion 104 and drop to the sheet below without hitting any hard surfaces, such as a portion of the frame, a conveyor, etc., which might bruise the fruit or crack the shell of the nut. Top sheet portion or catcher 104 extends outwardly past conveyors 14, 20, 59 and 61 and covers same and is formed of a resilient material such as canvas.

A flexible inverted umbrella-like drape or canopy 107 is provided to catch the fallen fruit or nuts which are shaken from the tree and comprises a first sheet portion 108 and a second sheet portion 110. First sheet portion 108 extends from a first side of forward frame portion 12 and the outer top edge portion of first conveyor 14. The outer edge of the first sheet portion 108 is removably attached to the outer ends of support rods 112, 114, 116, 118, 120 and 122. A section of the forward portion of first sheet portion 108 extends downwardly from the outer end of support rod 112 to the top opening of container or box 68 to direct fruit or nuts into container or box 68. The inner ends of support rods 112-122 are supported for pivotal movement by sleeves 124, 126, 128, 130, 132 and 134 positioned at predetermined locations along the outer edge or surface of first conveyor 14. Cables 113-123 are connected between support rods 112-122, respectively, and first conveyor 14 to provide additional support to support rods 112-122. To reduce the overall weight of the present invention, support rods 112-122 are fabricated from 14 gauge, $1\frac{1}{2} \times 3$ inch square tube stock. Second sheet portion 110 extends from a second side of forward frame portion 12 and the outer top edge portion of second conveyor 20. The outer edge of the second sheet portion 110 is removably attached to the outer ends of support rods 136, 138, 140, 142, 144 and 146. A section of the forward portion of second sheet portion 110 extends downwardly from the outer end of support rod 136 to the top opening of container or box 68 to direct fruit or nuts into container or box 68. None of the support rods are exposed to falling fruit or nuts. The inner ends of support rods 136-146 are supported for pivotal movement by sleeves 148, 150, 152, 154, 156 and 158 positioned at predetermined locations along the outer edge or surface of second conveyor 20. Cables 137-147 are connected between support rods 136-146, respectively, and second conveyor 20 to provide additional support to rods 136-146. To reduce the overall weight of the present invention, support rods 136-146 are fabricated from 14 gauge, $1\frac{1}{2} \times 3$ inch square tube stock. Support rod 122 includes at its inner end, above sleeve 134, a sprocket 160 which is operatively connected to hydraulic motor and drive 162 by endless chain 164. Support rod 146 includes at its inner end, above sleeve 158, a sprocket 166 which is operatively connected to hydraulic motor and drive 168 by endless chain 170. Hydraulic motor and drive 162, when activated, causes support rod 122 to pivot clockwise (from the position shown in FIG. 1) up to 180 degrees. Hydraulic motor and drive 168, when activated, causes support rod 146 to pivot counterclockwise (from the position shown in FIG. 1) up to 180 degrees. It will be appreciated that when support rods 122 and 146 are pivoted away from their position as depicted in FIG. 1 then their movement, together with first sheet portion 108 and second sheet portion 110, will cause the remaining support rods on each side of the fruit and nut harvesting apparatus 10 to pivot accordingly, thereby reducing the overall width of the apparatus 10.

Shaker means 172 is operatively attached to and supported only by the rear portion of said conventional farm tractor 56 and includes means to engage the trunk of the tree 174 such that when the shaker means 172 is activated the tree 174 will be shaken such that the fruit or nuts will be dislodged from said tree 174 and will be caught and collected by the fruit and nut harvesting apparatus 10.

The present invention is, so to speak, built around the farm tractor 56 or other power unit to provide an overall balanced system or device. Balance-wise, the farm tractor 56 is in the middle of the overall device or system which allows the fruit and nut harvesting apparatus 10 to be built with a greater diameter of catching device. The portion of weight of the fruit and nut harvesting apparatus 10 which is supported by the front of the conventional farm tractor 56 is designed to generally offset the weight of the shaker means 172 which is supported solely by the rear of the conventional farm tractor 56 to give a balanced machine. In the prior art, the harvesting apparatus is either built in front of the power unit or is built to extend behind it which results in an out-of-balance device.

The operation of the fruit and nut harvesting apparatus 10 will be initiated with support arm 122 being in a position of approximately 180 degrees clockwise from the position shown in FIG. 1 and with support arm 146 being in a position of approximately 180 degrees counterclockwise from the position shown in FIG. 1. The conventional farm tractor 56, with the fruit and nut harvesting apparatus 10 being supported thereon, is moved rearwardly such that support means 28 and 32 essentially straddle the trunk of tree 174 and shaker means 172 is in a position such that it is capable of engaging the trunk of tree 174. Hydraulic motors and drives 162 and 168 are activated such that support rods 122 and 146 are pivoted counterclockwise and clockwise, respectively, to cause them to overlap and place first sheet portion 108 and second sheet portion 110 in a surrounding relationship with respect to the trunk of tree 174 (See FIG. 3). Third sheet portion 176 is operatively attached to second sheet portion 110 and overlaps first sheet portion 108 to assure that there are not any voids in the area around the trunk of the tree 174 where fruit or nuts might miss canopy 107 and hit the ground. The conveyors 14, 20, 59 and 61 are activated as well as hydraulic motor 90 and blowers 86. The shaker means 172 is then activated such that the fruit or nuts fall onto the surface of the flexible inverted umbrella-like drape or canopy 107 and top sheet portion or catcher 104. The fruit or nuts which fall onto the top sheet portion or catcher 104 will roll downwardly on the surface thereof and drop off the edge thereof onto either the first sheet portion 108 or the second sheet portion 110. From the first sheet portion 108 and the second sheet portion 110, the fruit or nuts will roll downwardly and roll into either first conveyor 14 or second conveyor 20 where they will be conveyed into either the third conveyor 59 or the fourth conveyor 61. Blowers 86 will blow the debris from the third conveyor 59 and the fourth conveyor 61 and allow the debris-free fruit or nuts to be deposited into container or box 68. When the tree 174 is substantially free of fruit or nuts, the conveyors 14, 20, 59 and 61 are deactivated as well as hydraulic motor 90 and blowers 86. Hydraulic motors and drives 162 and 168 are activated such that support rods 122 and 146 are pivoted clockwise and counterclockwise, respectively, to cause support rods 122 and 146 to assume a position alongside first and second conveyors 14 and 20, respectively. Shaker means 172 is removed from its shake position with respect to the trunk of tree 174 and the conventional farm tractor 56 moves the fruit and nut harvesting apparatus 10 to another tree where the process is repeated. After the harvesting is completed, the fruit and nut harvesting apparatus 10 is removed from the conventional farm tractor 56 and the conventional farm tractor 56 is used for other farm duties.

Thus, it is apparent that there has been provided in accordance with this invention, fruit and nut harvesting apparatus that substantially incorporates the advantages set forth above. The apparatus has been designed to reduce not only the complexity of the apparatus but also to reduce the number of elements included therein. Although the present invention has been described in conjunction with specific forms thereof, it is evident that many alternatives, modifications and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiment. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined in the appended claims.

I claim:

1. An "add-on unit" apparatus to be removably mounted on a farm tractor or other power unit for harvesting fruit or nuts from a tree, said "add-on unit" apparatus comprising:

a forward frame portion;

first mounting means on said forward frame portion, said first mounting means being capable of being removably attached to a first predetermined location on said farm tractor or other power unit;

second mounting means on said forward frame portion, said second mounting means being capable of being removably attached to a second predetermined location on said farm tractor or other power unit;

a first conveyor means having a front portion and a rear portion, said front portion being operatively connected by pivotal means to said forward frame portion for pivotal movement with respect thereto, said first conveyor means extending rearwardly from said forward frame portion and along one side of said farm tractor or other power unit;

a second conveyor means having a front portion and a rear portion, said front portion being operatively connected by pivotal means to said forward frame portion for pivotal movement with respect thereto, said second conveyor means extending rearwardly from said forward frame portion in a generally parallel relationship with respect to said first conveyor means and along an opposite side of said farm tractor or other power unit;

a cross member means operatively connected between said rear portion of said first conveyor means and said rear portion of said second conveyor means, said cross member means being positioned behind said farm tractor or other power unit and including means capable of removably mounting said cross member means to said farm tractor or other power unit;

a first support means operatively attached to said rear portion of said first conveyor means to support said rear portion of said first conveyor means a predetermined distance above ground, said first support means includes an offset axle and wheel means to allow said wheel means to pivot with respect to said rear portion of said first conveyor means; and a second support means operatively attached to said rear portion of said second conveyor means to support said rear portion of said second conveyor means a predetermined distance above ground, said second support means includes an offset axle and wheel means to allow said wheel means to pivot with respect to said rear portion of said second conveyor means.

2. The "add-on unit" apparatus of claim 1 further including a cover frame portion attached to said forward frame portion and operatively positioned between said first and second conveyor means, and a resilient top sheet portion operatively supported by said cover frame portion, said resilient top sheet portion extending outwardly past said first and second conveyor means whereby any fruit or nuts falling from the tree will fall onto said resilient top sheet portion rather than in between or onto said first and second conveyor means.

3. The "add-on unit" apparatus of claim 2 further including a third conveyor means operatively supported by said forward frame portion and having a front portion and a rear portion, said rear portion of said third conveyor means being operatively positioned to receive said fruit or nuts discharged from said front portion of said first conveyor means, and a fourth conveyor means operatively supported by said forward frame portion and having a front portion and a rear portion, said rear portion of said fourth conveyor means being operatively positioned to receive said fruit or nuts discharged from said front portion of said second conveyor means.

4. The "add-on unit" apparatus of claim 3 further including first blower means operatively positioned with respect to said front portion of said third conveyor means to remove debris from the fruit or nuts prior to their discharge from said third conveyor means, and second blower means operatively positioned with respect to said front portion of said fourth conveyor means to remove debris from the fruit or nuts prior to their discharge from said fourth conveyor means.

5. The "add-on unit" apparatus of claim 4 wherein said third conveyor means further includes a floor portion in said front portion, said floor portion includes apertures formed therein to operatively interface with said first blower means, and said fourth conveyor means further includes a floor portion in said front portion, said floor portion includes apertures formed therein to operatively interface with said second blower means.

6. The "add-on unit" apparatus of claim 3 further including a predetermined number of first support arms operatively connected at predetermined locations along said first conveyor means, first resilient sheet means having an inner edge and an outer edge, said inner edge being operatively connected along said first conveyor means and said forward frame portion, said outer edge being operatively connected at predetermined locations to said predetermined number of first support arms, said predetermined number of first support arms being supported for pivotal movement with respect to said first conveyor means.

7. The "add-on unit" apparatus of claim 6 wherein a predetermined one of said first support arms is operatively connected to a first drive means to cause pivotal movement of said predetermined one of said first support arms, said first drive means includes a drive motor supported by said first conveyor means, a sprocket means connected to said predetermined one of said first support arms and connecting means operatively positioned between said drive motor and said sprocket means.

8. The "add-on unit" apparatus of claim 7 further including a predetermined number of second support arms operatively connected at predetermined locations along said second conveyor means, second resilient sheet means having an inner edge and an outer edge, said inner edge being operatively connected along said second conveyor means and said forward frame portion, said outer edge being operatively connected at predetermined locations to said predetermined number of second support arms, said predetermined number of second support arms being supported for pivotal movement with respect to said second conveyor means.

9. The "add-on unit" apparatus of claim 8 wherein a predetermined one of said second support arms is operatively connected to a second drive means to cause pivotal movement of said predetermined one of said second support arms, said second drive means includes a drive motor supported by said second conveyor means, a sprocket means connected to said predetermined one of said second support arms and connecting means operatively positioned between said drive motor and said sprocket means.

10. An "add-on unit" apparatus to be removably mounted on a farm tractor or other power unit for harvesting fruit or nuts from a tree, said "add-on unit" apparatus comprising:
a forward frame portion, said forward frame portion including mounting means capable of removably mounting said forward frame portion to said farm tractor or other power unit;
a first conveyor means having a front portion and a rear portion, said front portion being operatively connected by pivotal means to said forward frame portion for pivotal movement with respect thereto, said first conveyor means extending rearwardly from said forward frame portion and along one side of said farm tractor or other power unit;
a second conveyor means having a front portion and a rear portion, said front portion being operatively connected by pivotal means to said forward frame portion for pivotal movement with respect thereto, said second conveyor means extending rearwardly from said forward frame portion in a generally parallel relationship with respect to said first conveyor means and along an opposite side of said farm tractor or other power unit;
a cross member means operatively connected between said rear portion of said first conveyor means and said rear portion of said second conveyor means, said cross member means being positioned behind said farm tractor or other power unit and including means capable of removably mounting said cross member means to said farm tractor or other power unit;
a cover frame portion attached to said forward frame portion and operatively positioned between said first and second conveyor means; and
a resilient top sheet portion operatively supported by said cover frame portion, said resilient top sheet portion extending outwardly past said first and second conveyor means to cover said farm tractor or other power unit and said first and second conveyor means whereby any fruit or nuts falling from the tree will fall onto said resilient top sheet portion rather than in between or onto said first and second conveyor means or onto said farm tractor or other power unit.

11. The "add-on unit" apparatus of claim 10 further including a first support means operatively attached to said rear portion of said first conveyor means to support said rear portion of said first conveyor means a predetermined distance above ground, said first support means includes an offset axle and wheel means to allow said wheel means to pivot with respect to said rear portion of said first conveyor means, and a second support means operatively attached to said rear portion of said second conveyor means to support said rear portion of said second conveyor means a predetermined distance above ground, said second support means includes an offset axle and wheel means to allow said wheel means to pivot with respect to said rear portion of said second conveyor means.

12. The "add-on unit" apparatus of claim 11 further including a third conveyor means operatively supported by said forward frame portion and having a front portion and a rear portion, said rear portion of said third conveyor means being operatively positioned to receive said fruit or nuts discharged from said front portion of said first conveyor means, and a fourth conveyor means operatively supported by said forward frame portion and having a front portion and a rear portion, said rear portion of said fourth conveyor means being operatively positioned to receive said fruit or nuts discharged from said front portion of said second conveyor means.

13. The "add-on unit" apparatus of claim 12 further including a predetermined number of first support arms operatively connected at predetermined locations along said first conveyor means, first resilient sheet means having an inner edge and an outer edge, said inner edge being operatively connected along said first conveyor means and said forward frame portion, said outer edge being operatively connected at predetermined locations to said predetermined number of first support arms, said predetermined number of first support arms being supported for pivotal movement with respect to said first conveyor means.

14. The "add-on unit" apparatus of claim 13 wherein a predetermined one of said first support arms is operatively connected to a first drive means to cause pivotal movement of said predetermined one of said first support arms, said first drive means includes a drive motor supported by said first conveyor means, a sprocket means connected to said predetermined one of said first support arms and connecting means operatively positioned between said drive motor and said sprocket means.

15. The "add-on unit" apparatus of claim 14 further including a predetermined number of second support arms operatively connected at predetermined locations along said second conveyor means, second resilient sheet having an inner edge and an outer edge, said inner edge being operatively connected along said second conveyor means and said forward frame portion, said outer edge being operatively connected at predetermined locations to said predetermined number of second support arms, said predetermined number of second support arms being supported for pivotal movement with respect to said second conveyor means.

16. The "add-on unit" apparatus of claim 15 wherein a predetermined one of said second support arms is operatively connected to a second drive means to cause pivotal movement of said predetermined one of said second support arms, said second drive means includes a drive motor supported by said second conveyor means, a sprocket means connected to said predetermined one of said second support arms and connecting means operatively positioned between said drive motor and said sprocket means.

17. Apparatus for harvesting fruit or nuts from a tree, said apparatus comprising:
a forward frame portion;
a first self-supporting conveyor means which does not require a separate supporting framework along the length thereof, said first self-supporting conveyor means having a front portion and a rear portion, said front portion being operatively connected by pivotal means to said forward frame portion for pivotal movement with respect thereto, said first self-supporting conveyor means extending rearwardly from said forward frame portion;
a second self-supporting conveyor means which does not require a separate supporting framework along the length thereof, said second self-supporting conveyor means having a front portion and a rear portion, said front portion being operatively connected by pivotal means to said forward frame portion for pivotal movement with respect thereto, said second self-supporting conveyor means extending rearwardly from said forward frame portion in a generally parallel relationship with respect to said first self-supporting conveyor means;
a cross member means operatively connected between said rear portion of said first self-supporting conveyor means and said rear portion of said second self-supporting conveyor means;
a first support means operatively attached to said rear portion of said first self-supporting conveyor means to support said rear portion of said first self-supporting conveyor means a predetermined distance above ground, said first support means includes an offset axle and a wheel means to allow said wheel means to pivot with respect to said rear portion of said first self-supporting conveyor means; and
a second support means operatively attached to said rear portion of said second self-supporting conveyor means to support said rear portion of said second self-supporting conveyor means a predetermined distance above ground, said second support means includes an offset axle and wheel means to allow said wheel means to pivot with respect to said rear portion of said second self-supporting conveyor means.

18. The apparatus of claim 17 further including a cover frame portion attached to said forward frame portion and operatively positioned between said first and second self-supporting conveyor means, and a resilient top sheet portion operatively supported by said cover frame portion, said resilient top sheet portion extending outwardly past said first and second self-supporting conveyor means whereby any fruit or nuts falling from the tree will fall onto said resilient top sheet portion rather than in between or onto said first and second self-supporting conveyor means.

19. The apparatus of claim 18 further including a third conveyor means operatively supported by said forward frame portion and having a front portion and a rear portion, said rear portion of said third conveyor means being operatively positioned to receive said fruit or nuts discharged from said front portion to said first self-supporting conveyor means, and a fourth conveyor means operatively supported by said forward frame portion and having a front portion and a rear portion, said rear portion of said fourth conveyor means being operatively positioned to receive said fruit or nuts discharged from said front portion to said second self-supporting conveyor means.

20. The apparatus of claim 19 further including a first blower means operatively positioned with respect to said front portion of said third conveyor means to remove debris from the fruit or nuts prior to their discharge from said third conveyor means, and second blower means operatively positioned with respect to said front portion of said fourth conveyor means to remove debris from the fruit or nuts prior to their discharge from said fourth conveyor means.

* * * * *